(12) United States Patent
Sugihara et al.

(10) Patent No.: US 10,168,454 B2
(45) Date of Patent: Jan. 1, 2019

(54) HEAD-MOUNTED DISPLAY DEVICE

(71) Applicant: OLYMPUS CORPORATION, Tokyo (JP)

(72) Inventors: Ryohei Sugihara, Tokyo (JP); Shinya Takahashi, Tokyo (JP); Yoichi Iba, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 257 days.

(21) Appl. No.: 14/643,042

(22) Filed: Mar. 10, 2015

(65) Prior Publication Data

US 2015/0253576 A1    Sep. 10, 2015

(30) Foreign Application Priority Data

Mar. 10, 2014  (JP) .................................. 2014-046367

(51) Int. Cl.
*G02B 5/04*    (2006.01)
*G02B 27/00*   (2006.01)
*G02B 27/01*   (2006.01)

(52) U.S. Cl.
CPC ........... *G02B 5/04* (2013.01); *G02B 27/0018* (2013.01); *G02B 27/0172* (2013.01);
(Continued)

(58) Field of Classification Search
CPC ........... G02B 27/0172; G02B 27/0101; G02B 2027/0178; G02B 2027/0132; G02B 2027/011
(Continued)

(56) References Cited

U.S. PATENT DOCUMENTS

2010/0177388 A1* 7/2010 Cohen .................. G02B 6/0038
                                                          359/566
2012/0086623 A1* 4/2012 Takagi ................. G02B 6/0053
                                                             345/7
(Continued)

FOREIGN PATENT DOCUMENTS

| JP | 2007-286317 A | 11/2007 |
|---|---|---|
| JP | 4766913 B2 | 9/2011 |
| JP | 2011-203379 A | 10/2011 |

OTHER PUBLICATIONS

Japanese Office Action dated Aug. 29, 2017 in Japanese Patent Application No. 2014-046367.

*Primary Examiner* — Joseph P Martinez
*Assistant Examiner* — Vipin Patel
(74) *Attorney, Agent, or Firm* — Scully, Scott, Murphy & Presser, P.C.

(57) ABSTRACT

A head-mounted display device is provided, the head-mounted display device including: a display element; a light guide prism that includes an incident surface through which image light from the display element enters and that guides the image light to user's eyes; and a housing that contains the display element and the light guide prism; and support unit that fixes the housing to user's head. The light guide prism is partially covered by and contained in the housing. A portion of side surface of the light guide prism covered by the housing is formed with a first groove, and portion of side surface of the light guide prism exposed outside the housing is formed with a second groove. Depth of the first groove measured from the side surface is greater than that of the second groove.

8 Claims, 6 Drawing Sheets

(52) U.S. Cl.
CPC .. *G02B 27/0176* (2013.01); *G02B 2027/0143* (2013.01); *G02B 2027/0178* (2013.01)

(58) Field of Classification Search
USPC .............. 359/629–633, 636, 639–640, 618
See application file for complete search history.

(56) References Cited

U.S. PATENT DOCUMENTS

| | | | |
|---|---|---|---|
| 2012/0242561 A1* | 9/2012 | Sugihara | G02B 27/0172 345/8 |
| 2013/0222919 A1* | 8/2013 | Komatsu | G02B 27/01 359/630 |

* cited by examiner

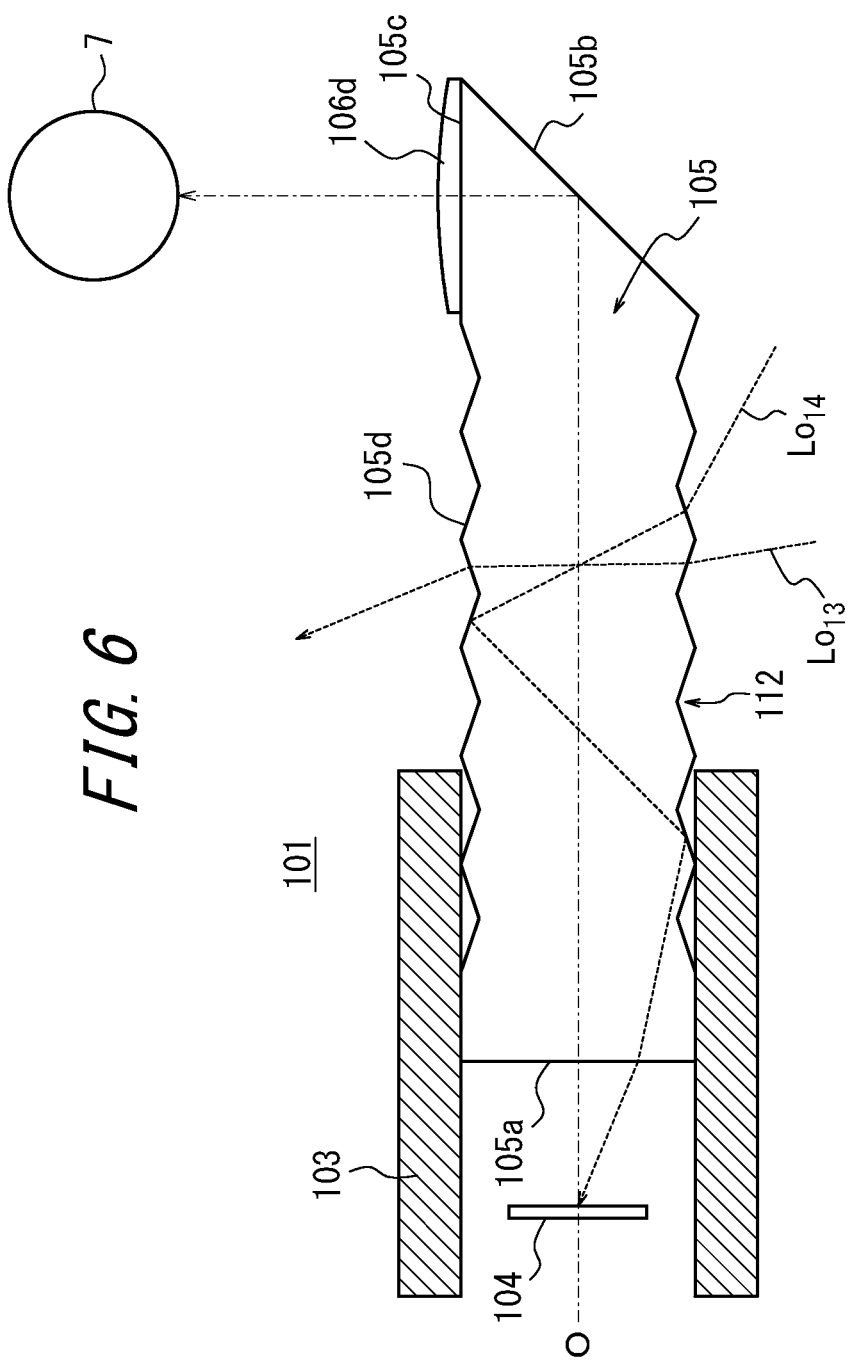

HEAD-MOUNTED DISPLAY DEVICE

CROSS-REFERENCE TO RELATED APPLICATION

The present application claims priority from Japanese Application No. 2014-046367, filed on Mar. 10, 2014, the content of which is incorporated herein by reference.

TECHNICAL FIELD

The present invention relates to a head-mounted display device.

BACKGROUND

In recent years, compact and wearable head-mounted display devices to be worn on the head or glasses have been proposed. Known examples of such a head-mounted display device include the one that enlarges light of an image (hereinafter, called "image light") displayed on a compact display element fixed to the temple by a lens and guides the image light to the eyes of the user by an eyepiece optical system (a light guide prism) to display the image light as an enlarged virtual image in a field of view of a user. (Refer to Patent Literatures 1 and 2, for example.) Using the compact and lightweight light guide prism allows the entire appearance of the head-mounted display device to be compact and lightweight without interrupting sightlines considerably. Such a head-mounted display device may be used as a wearable device.

However, the smaller the light guide prism becomes, the more likely it is the light (hereinafter, called "side surface reflected irregular light") reflected by, for example, inner side surfaces of the light guide prism is produced. When projected into the eyes, the side surface reflected irregular light tends to cause ghost and flare. The ghost, in particular, appears closer to the image present in the field of view as the cross-sectional dimension of the light guide prism becomes smaller, thereby giving severe discomfort feeing to the user. In view of the above, Patent Literature 2 provides the light guide prism, on the side surfaces thereof, with V-shaped grooves having a large tilt angle relative to the side surfaces, in order to remove the unwanted side surface reflected irregular light in the light guide prism.

CITATION LIST

Patent Literatures

Patent Literature 1: Japanese Patent No. 4766913
Patent Literature 2: Japanese Patent Application Publication No. 2007-286317

SUMMARY OF INVENTION

Although the V-shaped grooves having the large tilt angle are highly effective in cutting the ghost light or the like in the displayed video, when formed on the side surfaces which are exposed outside a housing of the light guide prism, these V-shaped grooves let outer light enter and reach the display element. This causes flare or the like and deteriorates image quality such as by lowering contrast of the displayed image, and also induces photoelectric current in the display element and destabilizes operations of the display element.

FIG. 5 illustrates how natural light enters the light guide prism in the presence of the V-shaped grooves formed in the light guide prism according to the conventional technology. The figure illustrates a head-mounted display device 101 including a housing 103, a display element 104 contained in the housing 103, and a light guide prism 105 partially contained in the housing 103. In the image light emitted from the display element 104, light (hereinafter, called "regular light") contributing to imaging of the desired displayed image in the field of view of the user enters an incident surface 105a of the light guide prism 105 along an optical axis O. Then, the regular light is reflected by a reflection surface 105b and is emitted toward the eyeballs of a user through an emission surface 105c on which an eyepiece 106 is attached.

A plurality of V-shaped grooves 111 having a large tilt angle (sharp inclination) are located at an interval along the optical axis O on a side surface 105d (which collectively refers to four side surfaces of the light guide prism 105) defining an optical path of the light guide prism 105. The V-shaped grooves 111 serve to pass light $Li_{11}$, $Li_{12}$, and $Li_{13}$, which have entered the light guide prism 105 through the side surface 105d, through to the outside of the light guide prism 105 or to reflect the light $Li_{11}$, $Li_{12}$, and $Li_{13}$. Since coating of the side surface 105d of the light guide prism 105 is difficult to apply due to its high cost and tendency to peel off from the optical resin, the side surface 105d of the light guide prism 105 formed with the grooves 111 is an optical surface that is left untreated with a light shielding coating. In the presence of the V-shaped grooves having the large tilt angle, natural light $Lo_{11}$ enters a flat part of the side surface 105d with no groove in the light guide prism 105 and then passes to the outside through the opposing part of the side surface 105d. Thus, natural light $Lo_{11}$ does not affect the image of the display element 104 to be observed by the user. However, natural light $Lo_{12}$ enters one of the V-shaped grooves 111, and then undergoes repeated total reflection inside the light guide prism 105 to be directed to the display element 104. Thus, natural light $Lo_{12}$ causes a lower contrast and also destabilizes the operations of the display element 104.

On the other hand, as illustrated in FIG. 6, there has also been a method of providing the light guide prism 105, on the side surface 105d thereof, with numerous V-shaped grooves 112 having a small tilt angle (gradual inclination). With the numerous V-shaped grooves 112, the angle of reflection of image light hitting the side surface 105d is varied, so that light causing ghost (ghost light) is not emitted into eyeballs 7 through the emission surface 105c. This method, however, involves leakage of light beams to the outside the light guide prism 105 through the side surface 105d. The reason is that, due to the long light guide prism 105, repeated reflection of the image light emitted from the display element 104 at the side surface 105d of the light guide prism 105 results in changes in the angle of the light beams, and a total reflection condition is not fulfilled. The path of the image light leaking to the outside follows a reverse route of natural light entering the light guide prism 105 and reaching the display element 104. For example, in FIG. 6, natural light $Lo_{13}$ enters the light guide prism 105 through the side surface 105d and is emitted out from the opposing part of the side surface 105d. Thus, natural light $Lo_{13}$ does not affect the image to be observed. However, light, such as natural light $Lo_{14}$, also follows a path from the outside of the light guide prism 105, through one of the V-shaped grooves 112 and through repeated reflection inside the light guide prism 105, to the display element 104. This poses the problem of adverse effects such as flare and the resulting lower contrast when the aforementioned path is followed by intense light such as sunlight entering the light guide prism 105.

One aspect of the present invention resides in a head-mounted display device, including: a display element; a light guide prism that includes an incident surface through which image light from the display element enters the light guide prism, that guides the entered image light to user's eyes, and that emits the guided image light to user's eyeballs; a housing that contains the display element and the light guide prism; and a support unit that fixes the housing to a user's head. The light guide prism is partially covered by and contained in the housing, a portion of a side surface of the light guide prism that is covered by the housing being formed with a first groove, and a portion of the side surface of the light guide prism that is exposed outside the housing being formed with a second groove. A depth of the first groove measured from the side surface is greater than a depth of the second groove measured from the side surface.

Preferably, each of the first groove and the second groove is defined by two tilted surfaces and has a V-shaped sectional form.

Preferably, a tilt angle formed by the two tilted surfaces defining the first groove with respect to the side surface of the light guide prism that is located adjacent to the first groove is greater than that formed by the two tilted surfaces defining the second groove with respect to the side surface of the light guide prism that is located adjacent to the second groove.

Preferably, one of the two tilted surfaces defining the first groove that is located closer to the incident surface is formed at a tilt angle not satisfying a total reflection condition with respect to at least part of light beams constituting the image light, which directly enters the light guide prism from the display element through the incident surface, and one of the two tilted surfaces defining the second groove that is located closer to the incident surface is formed at a tilt angle satisfying the total reflection condition with respect to all of the light beams constituting the image light, which directly enters the light guide prism from the display element through the incident surface.

Furthermore, the two tilted surfaces of the first groove may be coated with a light shielding coating, or the two tilted surfaces of the first groove and the housing defines space that is embedded with a light shielding member. The light shielding member can be fixed to or formed on the housing.

Another aspect of the present invention resides in a head-mounted display device, including: a display element; a light guide prism that includes an incident surface through which image light from the display element enters the light guide prism, that guides the entered image light to user's eyes, and that emits the guided image light to user's eyeballs; a housing that contains the display element and the light guide prism; and a support unit that fixes the housing to a user's head. The light guide prism is partially covered by and contained in the housing, a portion of a side surface of the light guide prism that is covered by the housing being formed with a first groove, and a portion of the side surface of the light guide prism that is exposed outside the housing being formed with a second groove. A shape of the first groove differs from a shape of the second groove, and the first groove is treated with light shielding treatment, and the second groove is left untreated with light shielding treatment.

BRIEF DESCRIPTION OF DRAWINGS

The present invention will be further described below with reference to the accompanying drawings, wherein:

FIG. 6 illustrates how natural light enters a light guide prism in the presence of V-shaped grooves having a small tilt angle formed on a side surface of the light guide prism.

DESCRIPTION OF EMBODIMENTS

Preferred embodiments of the present invention are described below with reference to the accompanying drawings.

(First Embodiment)

Figure 1:
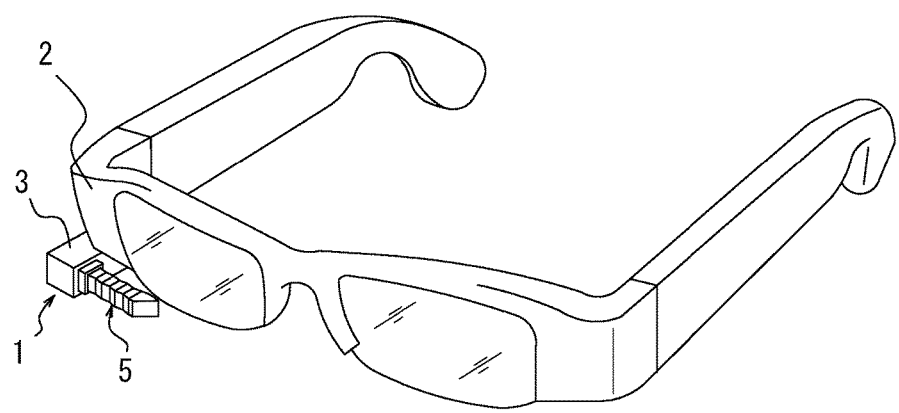
FIG. 1 is an exterior view of a head-mounted display device according to a first embodiment.

FIG. 1 is a perspective view illustrating an appearance of a head-mounted display device 1 according to a first embodiment of the present invention. The head-mounted display device 1 generally includes a housing 3 and a light guide prism 5. The housing 3 is fixed to a temple (a part of the frame that extend over a user's temple) of glasses 2, and the light guide prism 5 is supported, at one end portion thereof, by the housing 3 and extends, at another end portion thereof, in front of user's eyes when the head-mounted display device 1 is worn by the user. Accordingly, the glasses 2 serve as a support unit that mounts and supports the head-mounted display device 1 to the head. The housing 3 contains a built-in display element 4 (refer to FIGS. 2 to 6) such as a liquid crystal display (LCD) and an organic electroluminescence (EL). The housing 3 also includes, for example, an electronic circuit for displaying an image on the display element 4 and a communication function for receiving video data from outside of the housing 3 through a wire or wirelessly.

Figure 2:
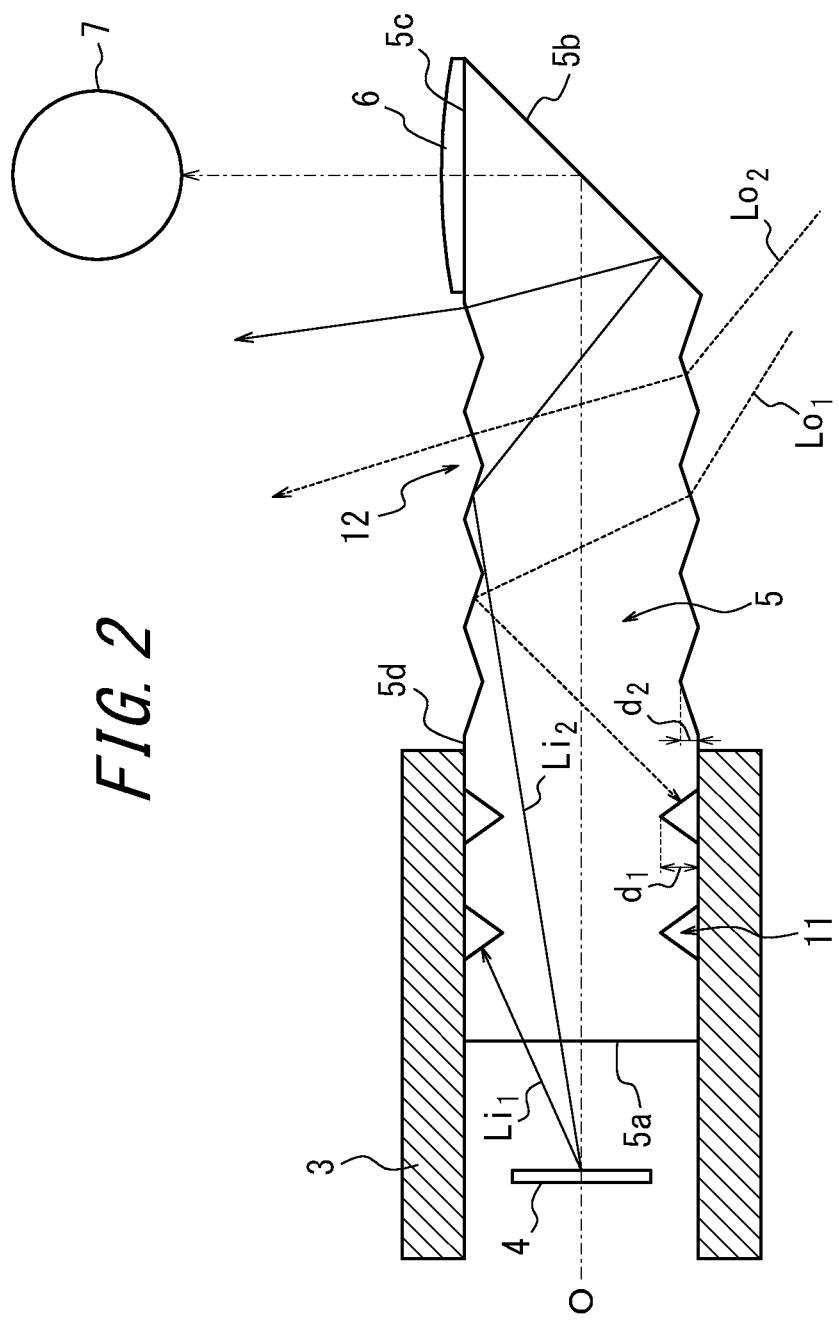
FIG. 2 is a configuration view of an optical system for projection of image light emitted from a display element included in the head-mounted display device illustrated in FIG. 1.

FIG. 2 is a configuration view of an optical system for projection of image light emitted from the display element 4 included in the head-mounted display device 1 illustrated in FIG. 1. The figure corresponds to a sectional view of a part of the head-mounted display device 1 viewed from above. The display element 4 contained in the housing 3 is retained by a retaining member which is not illustrated. A part of the light guide prism 5 that is located on the side of the display element 4 is covered and contained in the housing 3. Although not illustrated in FIG. 2, a back side of the display element 4 is also covered by the housing 3. The regular light, in the image light emitted from the display element 4, enters the incident surface 5a of the light guide prism 5, which is made of transparent resin or glass, along the optical axis O. Then, the regular light travels inside the light guide prism 5 in a longitudinal direction thereof, is reflected by a reflection surface 5b, passes through an emission surface 5c on which an eyepiece 6 is attached and through the eyepiece 6, and is emitted toward eyeballs 7. The eyepiece 6 does not need to be a separate member from the light guide prism 5, and the emission surface 5c of the light guide prism 5 may be formed as a curved surface having positive refractive power. The positive refractive power of the optical system allows the user to observe an enlarged virtual image of an image displayed on the display element 4.

The light guide prism 5 has a side surface 5d (which collectively refers to four side surfaces of the light guide prism 5) having a substantially rectangular section taken perpendicular to the optical axis O. A part of the side surface 5d that is located on the side of the user's eyes and the opposing part of the side surface 5d are each formed with a plurality of first grooves 11 and second grooves 12. The first grooves 11 are located in the housing 3, that is to say, are covered by the housing 3. The first grooves 11 have a V-shaped form, and a depth $d_1$ of the first grooves 11 measured from the side surface 5d is relatively greater than a depth $d_2$ of the second grooves 12 measured from the side surface 5d. Furthermore, the tilt angle formed by one of the tilted surfaces defining the V-shaped form of any one of the first grooves 11 that is located closer to the incident surface 5a, relative to the side surface 5d, is relatively great. The tilt angle herein refers to an acute angle (refer to the tilt angle θ in FIG. 3) formed between a part of the side surface 5d with no groove and the one of the tilted surfaces defining the V-shaped first groove 11. The second grooves 12 are located outside the housing 3, that is to say, are exposed outside the housing 3. The second grooves 12 have a V-shaped form, and the depth $d_2$ of the second grooves 12 measured from the side surface 5d is relatively small. Furthermore, the tilt angle formed by one of the tilted surfaces defining the V-shaped form of any one of the second grooves 12 that is located closer to the incident surface 5a, relative to a part of the side surface 5d with no groove, is relatively small.

With the above configuration, since the first grooves 11 have a relatively greater depth measured from the side surface 5d than that of the second grooves 12, light (unwanted light) $Li_1$, in the image light, not contributing to the imaging is blocked by the first grooves 11. This effectively prevents the occurrence of ghost light due to reflection, at the side surface 5d, of the unwanted light emitted from the display element 4. Furthermore, since the first grooves 11 are covered by the housing 3, light (hereinafter, called "natural light") may not enter the light guide prism 5 from outside the light guide prism 5 through the first grooves 11. Moreover, natural light $Lo_1$, which enters one of the second grooves 12, undergoes total reflection by another groove 12 formed in the light guide prism 5. As a result, even when the reflected natural light $Lo_1$ is directed toward the display element 4 in the light guide prism 5, it is blocked by one of the first grooves 11 with a relatively great depth that is located near the incident surface 5a. Consequently, the natural light $Lo_1$ is prevented from reaching the display element 4. That is to say, natural light such as the one denoted by reference numeral $Lo_{14}$ in FIG. 6 is prevented from reaching the display element 4. Thus, the above configuration better prevents the occurrence of ghost and also better prevents the occurrence of flare and the resulting lower contrast due to light entering from outside the light guide prism 5 compared with the configuration in which only either of the first grooves 11 having a great depth or the second grooves 12 having a small depth are formed on the side surface of the light guide prism 5.

Figure 3:
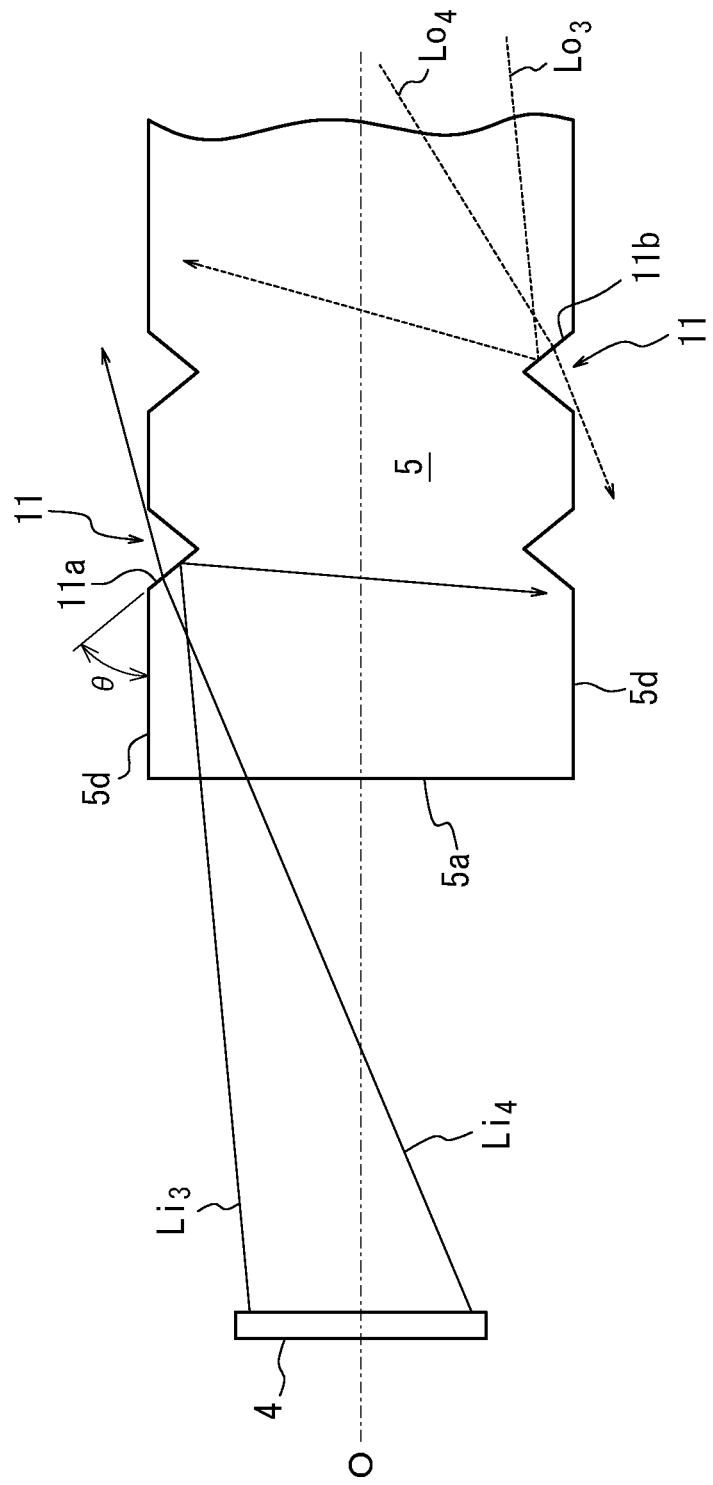
FIG. 3 is an enlarged view of the display element and an end portion of a light guide prism from which light enters as illustrated in FIG. 2.

Since each first groove 11 is defined by sharply tilted surfaces having a large tilt angle, the image light emitted from the display element 4, when reflected by the first groove 11, forms a light beam directed to a direction opposite to the incident surface 5c. This prevents the occurrence of ghost light observed by the user. FIG. 3 is an enlarged view of the display element 4 and an end portion of the light guide prism 5 from which light enters illustrated in FIG. 2. The tilt angle θ formed by one of the tilted surfaces of a first groove 11 (corresponding to one of the first grooves that is on the upper left side of FIG. 4) that is located closer to the incident surface 5a, relative to the side surface 5d, is set to be 45° or more. By doing so, unwanted light $Li_3$, which is emitted from the display element 4, passes through the incident surface 5a, and directly enters the tilted surface 11a of the first groove 11 that is located closer to the incident surface 5a at a relatively large incident angle, is reflected by the tilted surface 11a to be directed toward the incident surface 5a opposing to the emission surface 5c and emitted outside the light guide prism 5 through the opposing part of the side surface 5d of the light guide prism 5.

Furthermore, the tilted surface 11a of the first groove 11 that is located closer to the incident surface is formed at a tilt angle not satisfying a total reflection condition with respect to at least part of light beams constituting the image light, which directly enters the light guide prism 5 from the display element 4 through the incident surface 5a. By doing so, unwanted light $Li_4$, which is emitted to the tilted surface 11a at a relatively small incident angle, passes through the tilted surface 11a and escapes to the outside of the light guide prism 5. As a result, light not contributing to the imaging is prevented from being reflected by the side surface 5d of the light guide prism 5, and thus prevented from forming the side surface reflected irregular light which causes the occurrence of ghost.

Similarly, since the first groove 11 is defined by sharply tilted surfaces having a large tilt angle, as illustrated by natural light $Lo_3$ in FIG. 3, some natural light enters the light guide prism 5 and undergoes total reflection at a tilted surface 11b of a first groove 11 (corresponding to one of the first grooves that is on the lower right side of FIG. 3) that is located away from the incident surface 5a, and is emitted to the outside of the light guide prism 5 through the side surface 5d of the light guide prism 5. Furthermore, as illustrated by natural light $Lo_4$ in FIG. 3, some natural light passes through the tilted surface 11b and escapes to the outside of the light guide prism 5. Thus, natural light, which enters the light guide prism 5 through the side surface 5d of the light guide prism 5, is effectively blocked and better prevented from reaching the display element 4.

On the other hand, since each second groove 12 is defined by gradually tilted surfaces having a small tilt angle, unwanted light from the display element 4 undergoes total reflection at an angle that is different from an angle of reflection at a flat side surface with no groove. This deflects the light beams emitted from the emission surface 5c and the eyepiece 6 away from the eyeballs 7. In the example of FIG. 2, unwanted light $Li_2$, which is emitted to one of tilted surfaces defining a second groove 12, is deviated significantly from the direction of the optical axis O and emitted from the light guide prism 5 to an area outside the user's eyeballs 7. The emitted light is not observed by the user, and accordingly, does not cause ghost. Thus, the configuration with the second grooves 12 better prevents the occurrence of ghost compared with the configuration with the flat side surface 5d. Furthermore, since the user may touch a part of the surface of the light guide prism 5 that is exposed with the hand, this part tends to suffer from sebum dirt and dust. However, the second grooves 12 having a small tilt angle allow ease of cleaning of the exposed part of the surface, thereby preventing cracks that would have otherwise occurred in trough portions of the grooves due to the accumulated sebum dirt and dust.

Furthermore, since each second groove 12 is defined by gradually tilted surfaces having a small tilt angle, although being exposed outside the housing 3, the second groove 12 is capable of better preventing natural light from entering compared with a groove defined by sharply tilted surfaces having a large tilt angle. In the example of FIG. 2, reference numeral $Lo_2$ denotes a path of natural light entering the light guide prism 5 through a part of the side surface of the light guide prism 5 and emitted from the opposing part of the side surface. Such natural light does not affect an image observed by the user. As denoted by $Lo_1$ in FIG. 2 natural light entering the light guide prism 5 at a certain angle is reflected by the opposing part of the side surface to be directed toward the display element 4. Nevertheless, as described previously, the natural light $Lo_1$ is blocked by the one of the first grooves 11. Moreover, one of the tilted surfaces defining the second groove 12 that is located closer to the incident surface 5a is formed at a tilt angle satisfying the total reflection condition with respect to the image light, which directly enters the light guide prism 5 from the display element 4 through the incident surface 5a. By doing so, natural light entering the one of the tilted surfaces may not follow the reverse route of the image light, and thus may not be directly emitted to the display element 4. As a result, the occurrence of flare and lower contrast are further prevented.

In the aforementioned configuration, the first grooves 11 formed in the light guide prism 5 may be treated with light shielding treatment by applying a light absorbing coating to the first grooves 11, and the second grooves 12 may be left untreated with light shielding treatment. In this case, since the first grooves 11 are covered by the housing 3, the light shielding treatment is unlikely to create the problem of peeling of the coating from the first grooves 11. Such a light shielding coating serves to absorb the light passing through one of the tilted surfaces defining a first groove 11 that is located closer to the incident surface 5a, thereby preventing the light from entering the light guide prism 5 again through the other one of the tilted surfaces defining the first groove 11 that is located away from the incident surface 5a. As a result, the occurrence of ghost is prevented. The tilted surfaces defining the second grooves 12 are left untreated with light shielding treatment, and this avoids the risk of deterioration of the characteristics due to peeling of the light shielding coating from the second grooves 12.

As has been described, the present embodiment is capable of preventing the occurrence of ghost and is also capable of preventing the occurrence of flare and lower contrast due to the light entering from outside of the light guide prism 5.
(Second Embodiment)

Figure 4:
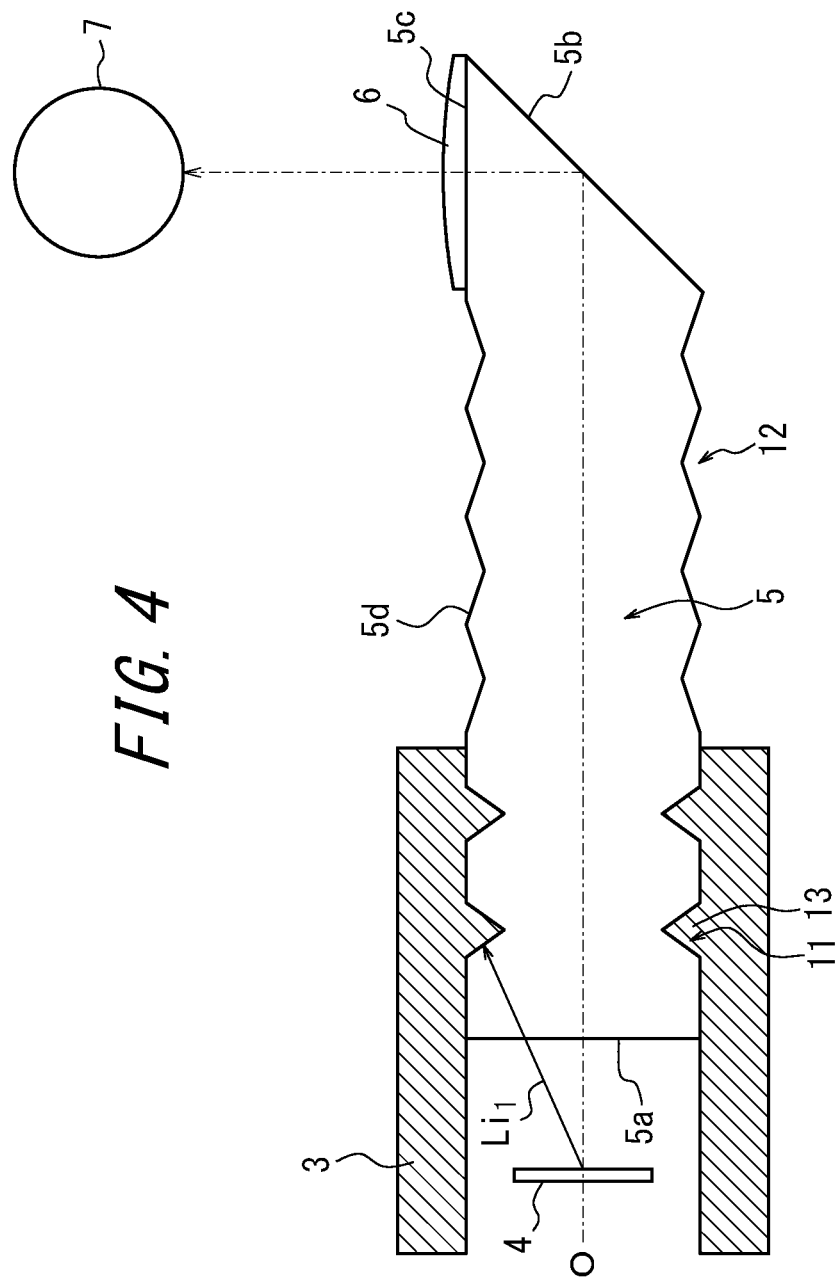
FIG. 4 is a configuration view of an optical system for projection of image light emitted from a display element included in a head-mounted display device according to a second embodiment.
Figure 5:
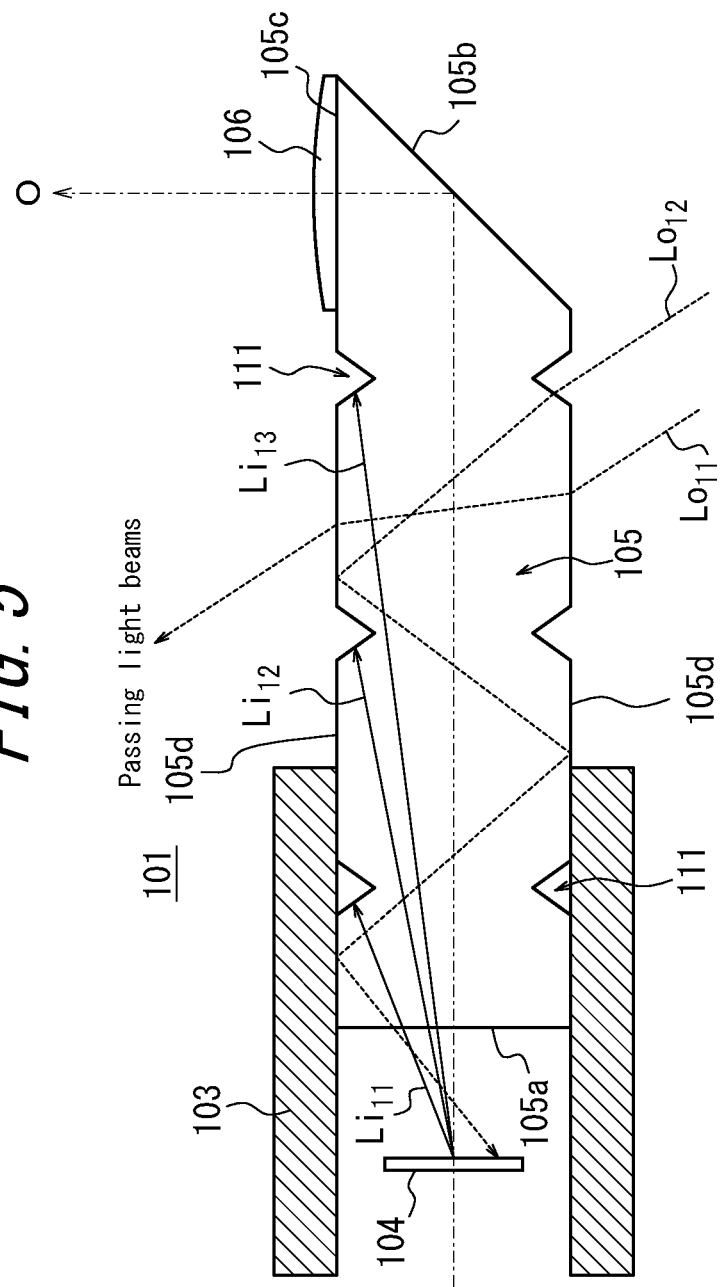
FIG. 5 illustrates how natural light enters a light guide prism in the presence of V-shaped grooves having a large tilt angle.

FIG. 4 is a configuration view of an optical system for projection of image light emitted from the display element 4 included in a head-mounted display device according to a second embodiment. In the present embodiment, instead of treating the first grooves 11 with light shielding treatment as in the head-mounted display device 1 according to the first embodiment, light shielding members 13 are fixed to or formed on an inner side surface of the housing 3. The light shielding members 13 have shapes that may fit into the first grooves 11 and accordingly, are each embedded in space formed by the two tilted surfaces defining the corresponding first groove 11 and the housing 3. Each light shielding member 13 serves to shield light passing through one of the tilted surfaces defining the corresponding first groove 11 that is located closer to the incident surface 5a, thereby preventing the light from entering the light guide prism 5 again through the other one of the tilted surfaces defining the corresponding first groove 11 that is located away from the incident surface 5a. As a result, the occurrence of ghost is prevented. The above configuration of the present embodiment also allows positioning and fixing of the light guide prism 5 relative to the housing 3 without the need for an adhesive or the like. The above configuration of the present embodiment also eliminates the need for light shielding treatment for the light guide prism 5, and as a result, manufacturing steps of the light guide prism 5 are reduced.

The present invention is not strictly limited to the above embodiments, and various changes and modifications can be made to the embodiments. For example, the support unit of the head-mounted display device is not limited to the form of glasses and may take a variety of forms, such as goggles and a helmet, which may be fixed to the user's head. The support unit may also be an attachment or the like to be coupled to glasses, a helmet, or other tools mounted over the head. The light guide prism does not need to be horizontally long when used. For example, the display element may be positioned over the forehead, and a vertically long light guide prism may be used.

The first grooves and the second grooves may be positioned differently. For example, the first grooves and the second grooves may be formed on one, three, or four side surfaces instead of two opposing side surfaces of the light guide prism. The first grooves and the second grooves may also be formed around the four side surfaces of the light guide prism. Alternatively, the first grooves and the second grooves may be alternatively formed in different positions on a surface located on the side of the user's eyes or the opposing surface along the direction of the optical axis O.

REFERENCE NUMERALS 1 head-mounted display device
2 glasses
3 housing
4 display element
5 light guide prism
6 eyepiece
7 eyeballs
11 first groove
12 second groove
13 light shielding member

The invention claimed is:
1. A head-mounted display comprising:
a display element;
a light guide prism extending in a longitudinal direction, the light guide prism having an optical axis along the longitudinal direction and having four side surfaces each having a substantially rectangular section taken perpendicular to the optical axis, the light guide prism including an incident surface through which image light from the display element enters the light guide prism, the light guide prism guiding the entered image light along the optical axis in the longitudinal direction to an eye of a user and emitting the guided image light from an emission surface to the eye of the user;
a housing that contains the display element and the light guide prism; and
a support unit that fixes the housing to a head of the user, wherein:
the light guide prism is partially covered by and contained in the housing on an end of the light guide prism closer to the incident surface such that a portion of at least one of the four side surfaces of the light guide prism that is covered by the housing being formed with a first groove open to the at least one of the four side surfaces, and a portion of the at least one of the four side surfaces of the light guide prism on an end of the light guide prism closer to the emission surface that is exposed outside the housing being formed with a second groove open to the at least one of the four side surfaces, a depth of the first groove measured from the at least one of the four side surfaces is greater than a depth of the second groove measured from the at least one of the four side surfaces;

each of the first groove and the second groove is defined by two tilted surfaces and has a V-shaped sectional form; and one of the two tilted surfaces defining the first groove that is located closer to the incident surface is formed at a tilt angle not satisfying a total reflection condition with respect to at least part of light beams constituting the image light, which directly enters the light guide prism from the display element through the incident surface, and one of the two tilted surfaces defining the second groove that is located closer to the incident surface is formed at a tilt angle satisfying the total reflection condition with respect to all of the light beams constituting the image light, which directly enters the light guide prism from the display element through the incident surface.

2. The head-mounted display device of claim 1, wherein a tilt angle formed by the two tilted surfaces defining the first groove with respect to the at least one of the four side surfaces of the light guide prism that is located adjacent to the first groove is greater than that formed by the two tilted surfaces defining the second groove with respect to the at least one of the four side surfaces of the light guide prism that is located adjacent to the second groove.

3. The head-mounted display device of claim 1, wherein the two tilted surfaces of the first groove are coated with a light shielding coating.

4. The head-mounted display device of claim 1, wherein the two tilted surfaces of the first groove and the housing defines space that is embedded with a light shielding member.

5. The head-mounted display device of claim 4, wherein the light shielding member is fixed to or formed on the housing.

6. The head-mounted display device of claim 1, wherein each of the first and second grooves comprise first and second sides, each of the first and second sides extending from the at least one of the four side surfaces of the light guide prism to an intersection with the other of the first and second sides.

7. A head-mounted display device, comprising:
a display element;
a light guide prism that includes an incident surface through which image light from the display element enters the light guide prism, the light guide prism guiding the entered image light to an eye of a user and emitting the guided image light to the eye of the user;
a housing that contains the display element and the light guide prism; and
a support unit that fixes the housing to a head of the user, wherein:

the light guide prism is partially covered by and contained in the housing such that a portion of a side surface of the light guide prism that is covered by the housing being formed with a first groove, and a portion of the side surface of the light guide prism that is exposed outside the housing being formed with a second groove, a depth of the first groove measured from the side surface is greater than a depth of the second groove measured from the side surface, each of the first groove and the second groove is defined by two tilted surfaces and has a V-shaped sectional form; and one of the two tilted surfaces defining the first groove that is located closer to the incident surface is formed at a tilt angle not satisfying a total reflection condition with respect to at least part of light beams constituting the image light, which directly enters the light guide prism from the display element through the incident surface, and one of the two tilted surfaces defining the second groove that is located closer to the incident surface is formed at a tilt angle satisfying the total reflection condition with respect to all of the light beams constituting the image light, which directly enters the light guide prism from the display element through the incident surface.

8. A head-mounted display device comprising:
a display element;
a light guide prism extending in a longitudinal direction, the light guide prism having an optical axis along the longitudinal direction and having four side surfaces each having a substantially rectangular section taken perpendicular to the optical axis, the light guide prism including an incident surface through which image light from the display element enters the light guide prism, the light guide prism guiding the entered image light along the optical axis in the longitudinal direction to an eye of a user and emitting the guided image light from an emission surface to the eye of the user;
a housing that contains the display element and the light guide prism; and
a support unit that fixes the housing to a head of the user, wherein:

the light guide prism is partially covered by and contained in the housing on an end of the light guide prism closer to the incident surface such that a portion of at least one of the four side surfaces of the light guide prism that is covered by the housing being formed with a first groove open to the at least one of the four side surfaces, and a portion of the at least one of the four side surfaces of the light guide prism on an end of the light guide prism closer to the emission surface that is exposed outside the housing being formed with a second groove open to the at least one of the four side surfaces, a depth of the first groove measured from the at least one of the four side surfaces is greater than a depth of the second groove measured from the at least one of the four side surfaces; and the first groove and the second groove are formed on each of the four side surfaces.

* * * * *